UNITED STATES PATENT OFFICE.

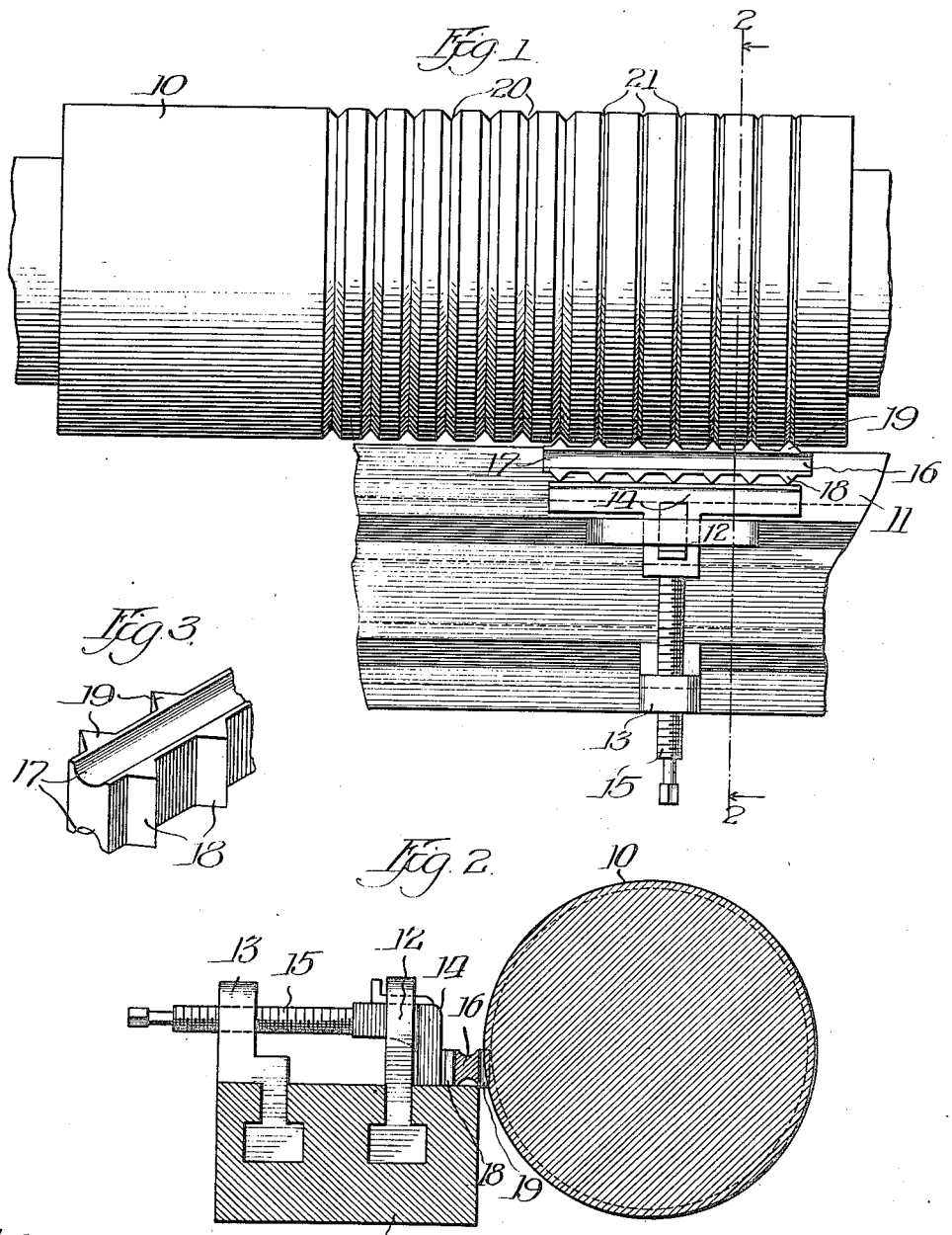

ELMER W. THOMAS, OF JOLIET, ILLINOIS.

METHOD OF TURNING ROLLS HAVING DUPLICATE PASSES.

1,151,737.  Specification of Letters Patent.  Patented Aug. 31, 1915.

Application filed March 14, 1914. Serial No. 824,657.

*To all whom it may concern:*

Be it known that I, ELMER W. THOMAS, a citizen of the United States, and resident of Joliet, in the county of Will and State of Illinois, have invented certain new and useful Improvements in Methods of Turning Rolls Having Duplicate Passes, of which the following is a specification.

My invention relates to the art of metal rolling and has particular reference to a novel method of preparing rolls having duplicate passes.

In the production of commercial rods, bars, etc., it is customary to provide rolls having a large number of duplicate passes. These rolls usually are provided with seventy passes, each a duplicate of the other. The problem involved in turning these rolls is considerable particularly in view of the fact that as stated, each pass must be a duplicate of the other. These rolls have usually been turned by the use of a single tool, one pass being turned at a time. This has required the use of a templet in order to turn each pass and has further required the location of a completed roll in proximity to the roll being turned in order that the passes in two rolls may be made to register. In spite of these precautions it is not unusual to require longitudinal adjustment of the rolls when changing from one pass to another to secure proper register.

By the use of my novel method herein described I am enabled to turn a large number of passes simultaneously; I avoid the use of templets or spacing devices; all the passes are turned exactly the same size and with exactly the same spacing relation to each other and the work may be performed much more quickly and satisfactorily.

My novel method may be said to consist in making a plurality of simultaneous cuts in the surface of a roll, then shifting the cutting device and roll relative to each other to cause the register of one of the cutting tools with a cut already made, then making other cuts, the spacing for the different cuts being secured by maintaining one of said cutting tools in register with a cut already formed.

An apparatus for carrying out my improved method is shown in the accompanying drawing, wherein—

Figure 1 is a plan view of a portion of a turning lathe having a roll mounted therein and provided with my novel cutting tool by means of which a plurality of cuts may be simultaneously made; Fig. 2 is a section on the line 2—2 of Fig. 1, and, Fig. 3 is a perspective view of a fragment of a cutting tool.

Referring more particularly to the drawings it will be seen that a roll 10 is mounted in a lathe on a portion of the bed of which is mounted a slide 11, within which is mounted a pair of brackets 12, 13. Carried by the bracket 12 is a tool support 14, adapted to be reciprocated toward the axis of the roll 10, by means of the screw 15. The tool 16, as best shown in Fig. 3, may consist of a bar having side channels 17, and provided with triangular cutting portions 18, 19, on opposite sides thereof, each side being a duplicate of the other. The top and bottom configuration is likewise the same. Such tool may have as many cutting portions as desired. It will be understood, however, that such a tool has four cutting edges; that is, a cutting edge at the top and bottom on both sides.

As shown in Fig. 1, a roll may be turned according to my novel method as follows: The tool 16 is suitably located in order to complete the cuts 20 at the center of the roll. These cuts will, of course, be made to the proper depth for the reason that the tool can only displace a certain amount of metal until the bar will contact the periphery of the roll. Thus there is no possibility of making the cut too deep. After the cuts 20 are completed the tool may be moved to the extreme right or until one of the cutting edges 18, at the extreme left hand portion of the tool registers with the extreme right hand cut 20. Other cuts 21, are then made, the exact spacing being secured by maintaining the one cutting edge in register with the right hand cut 20. Thus the complete roll may be turned all the cuts being made to the exact required depth and exactly spaced one from the other, all without the use of templets or requiring skilled labor.

The tool shown is provided with but seven cutting portions and the roll is shown as very short. It will be understood, however, that the usual roll is provided with seventy grooves or passes and that the cutting tool may have any number, usually seventeen, cutting portions or projections 18, 19. By following this method it will be found unnecessary to check up the cuts after having been made; nor will it be necessary to top the rolls as the thickness of the collars, which is the space between each pass, is exactly alike. Rolls may thus be produced at a greatly reduced cost both in labor and tool steel. There is less delay in the mill on account of changing passes as each pass is directly over each other and requires no endwise adjustment of the rolls.

I claim:

The herein described method of cutting passes in rolls, which consists in rotating a roll and subjecting it to the action of a tool having a series of cutting portions and cutting passes in the rolls by said cutting portions, relatively shifting the roll and tool in the direction of the axis of the roll to bring one of the terminal cutting portions into register with one of the passes and other cutting portions in coöperative relation with an uncut portion of the roll and subjecting said uncut portion of the roll to the action of the cutters to cut other passes, said one pass serving as a gage for successive passes.

ELMER W. THOMAS.

Witnesses:
C. H. HOSLER,
D. J. HAYS.